United States Patent
Patnaik et al.

(10) Patent No.: US 8,676,432 B2
(45) Date of Patent: Mar. 18, 2014

(54) FAULT PREDICTION FRAMEWORK USING TEMPORAL DATA MINING

(75) Inventors: Debprakash Patnaik, Bangalore (IN); Pulak Bandyopadhyay, Bangalore (IN); Steven W. Holland, St Clair, MI (US); Kootaala P. Unnikrishnan, Birmingham, MI (US); George Paul Montgomery, Jr., Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 716 days.

(21) Appl. No.: 12/686,963

(22) Filed: Jan. 13, 2010

(65) Prior Publication Data

US 2011/0172874 A1 Jul. 14, 2011

(51) Int. Cl.
G06F 7/00 (2006.01)
G06F 17/30 (2006.01)
G06F 15/18 (2006.01)

(52) U.S. Cl.
USPC ....... 701/29.1; 701/29.9; 701/31.6; 701/31.8; 701/31.9; 701/32.9; 701/33.5; 701/33.6; 701/33.7

(58) Field of Classification Search
USPC ........... 701/29.1, 29.9, 31.6, 31.8, 31.9, 32.9, 701/33.5–33.7
See application file for complete search history.

(56) References Cited

U.S. PATENT DOCUMENTS

| | | | |
|---|---|---|---|
| 6,415,395 B1* | 7/2002 | Varma et al. | 714/37 |
| 6,609,051 B2* | 8/2003 | Fiechter et al. | 701/29.3 |
| 7,526,461 B2* | 4/2009 | Srinivasa et al. | 706/20 |
| 7,558,771 B2* | 7/2009 | Barajas et al. | 706/46 |
| 2002/0007237 A1* | 1/2002 | Phung et al. | 701/33 |
| 2002/0173885 A1* | 11/2002 | Lowrey et al. | 701/29 |
| 2004/0085198 A1* | 5/2004 | Saito et al. | 340/438 |
| 2006/0111857 A1* | 5/2006 | Shah et al. | 702/85 |
| 2008/0030313 A1* | 2/2008 | Obradovich | 340/439 |
| 2008/0059120 A1* | 3/2008 | Xiao et al. | 702/184 |
| 2009/0216399 A1* | 8/2009 | Ishikawa | 701/33 |
| 2009/0254240 A1* | 10/2009 | Olsen et al. | 701/30 |
| 2009/0271066 A1* | 10/2009 | Underdal et al. | 701/35 |
| 2010/0023203 A1* | 1/2010 | Shibi | 701/33 |
| 2010/0030418 A1* | 2/2010 | Holland | 701/29 |
| 2010/0063668 A1* | 3/2010 | Zhang et al. | 701/30 |
| 2011/0118932 A1* | 5/2011 | Singh et al. | 701/33 |
| 2011/0145026 A1* | 6/2011 | Singh et al. | 705/7.11 |
| 2011/0172874 A1* | 7/2011 | Patnaik et al. | 701/33 |

FOREIGN PATENT DOCUMENTS

| CN | 1648960 A | 8/2005 |
|---|---|---|
| CN | 101126929 A | 2/2008 |

* cited by examiner

*Primary Examiner* — Thomas Black
*Assistant Examiner* — Sara Lewandroski
(74) *Attorney, Agent, or Firm* — John A. Miller; Miller IP Group, PLC

(57) ABSTRACT

A vehicle fault diagnosis and prognosis system includes a computing platform configured to receive a classifier from a remote server, the computing platform tangibly embodying computer-executable instructions for evaluating data sequences received from a vehicle control network and applying the classifier to the data sequences, wherein the classifier is configured to determine if the data sequences define a pattern that is associated with a particular fault.

21 Claims, 2 Drawing Sheets

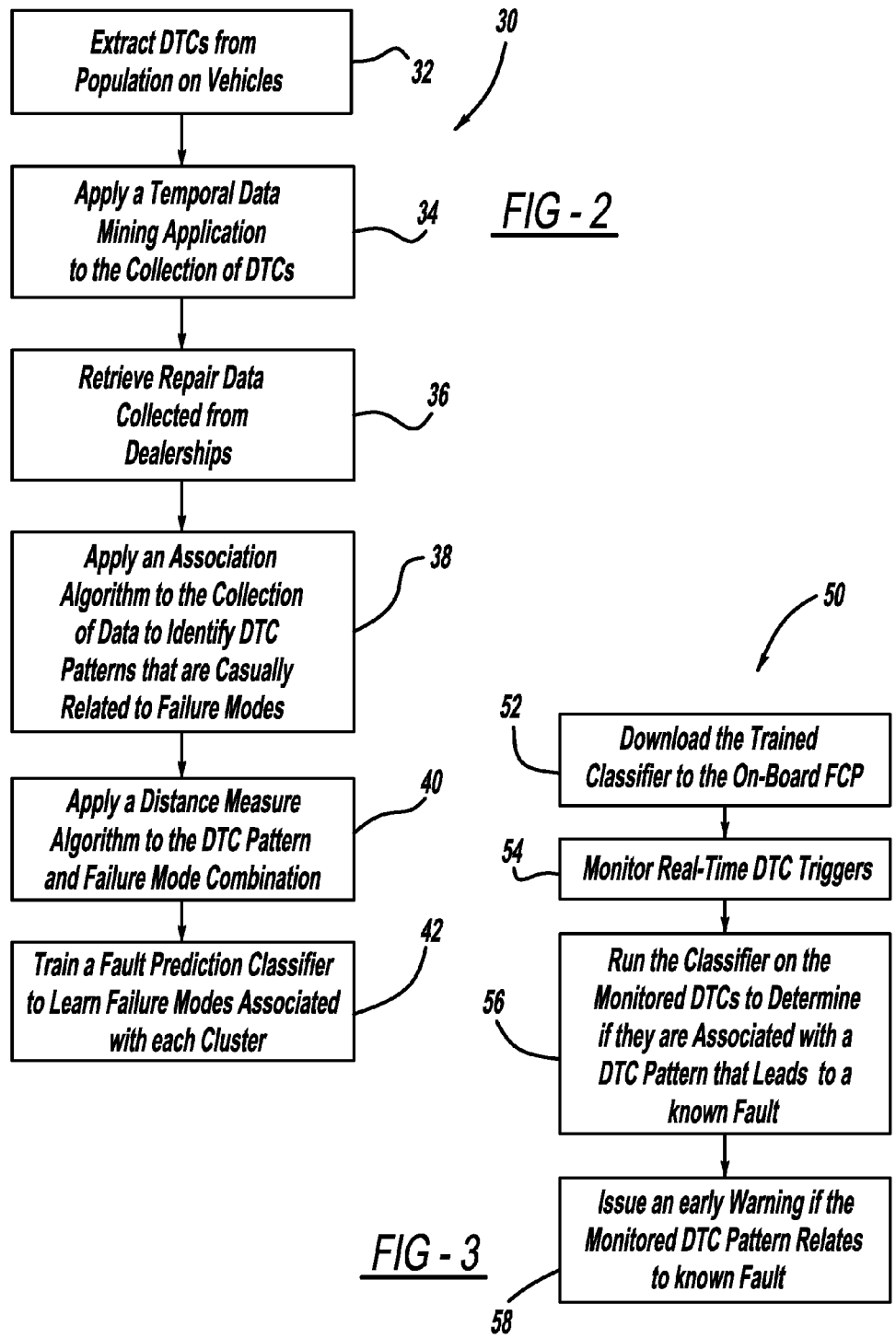

FAULT PREDICTION FRAMEWORK USING TEMPORAL DATA MINING

BACKGROUND

1. Field of the Invention

This invention relates generally to fault diagnosis and prognosis systems and, more particularly, to a fault diagnosis and prognosis system and method using temporal data mining.

2. Discussion of the Related Art

Diagnostic and prognostic techniques for monitoring a vehicle's state of health can help forecast the occurrence of a problem in order to take preventive measures before a significant incident occurs. These techniques become more important where a component or system failure can have critical implications, such as loss of vehicle functions. Further, manufacturers can minimize customer dissatisfaction caused by failures or degradations in vehicle performance.

Traditionally, fault diagnosis is performed off-board by a technician who connects a computer, or other diagnostic tool, to the vehicle's electrical bus that is connected to one of the vehicle's electronic control units (ECUs). Once connected, diagnostic trouble codes (DTCs) are extracted from the ECU and used to help determine what has caused the failure. More recently, vehicles have been equipped with on-board diagnostics, which are configured to provide a vehicle operator or technician with diagnostic information without having to manually connect to the vehicle's electrical bus. This diagnostic information however, whether received off-board or on-board, is limited to snap-shot data provided by the DTCs and selected operating parameters. Although DTC diagnostic data can help to determine the cause of an existing fault, DTCs were not designed to provide early warning of a component or system failure.

Therefore, what is needed is an enhanced diagnostic and prognostic system and method configured to provide early warning to a technician or vehicle operator that a component or system is likely to fail in some specified time frame.

SUMMARY

In accordance with the teachings of the present invention, a vehicle fault diagnosis and prognosis system includes a computing platform configured to receive a fault classifier from a remote server, the computing platform tangibly embodying computer-executable instructions for evaluating data sequences received from a vehicle control network and applying the classifier to the data sequences, wherein the classifier is configured to determine if the data sequences define a pattern that is associated with a particular fault.

Additional features of the present invention will become apparent from the following description and appended claims, taken in conjunction with the accompanying drawings.

BRIEF DESCRIPTION OF THE DRAWINGS

FIG. 2 is a flow chart illustrating a method for fault prediction, according to the system of FIG. 1.

FIG. 3 is a flow chart illustrating a method for fault prediction, according to the system of FIG. 1.

DETAILED DESCRIPTION OF THE EMBODIMENTS

Figure 1:
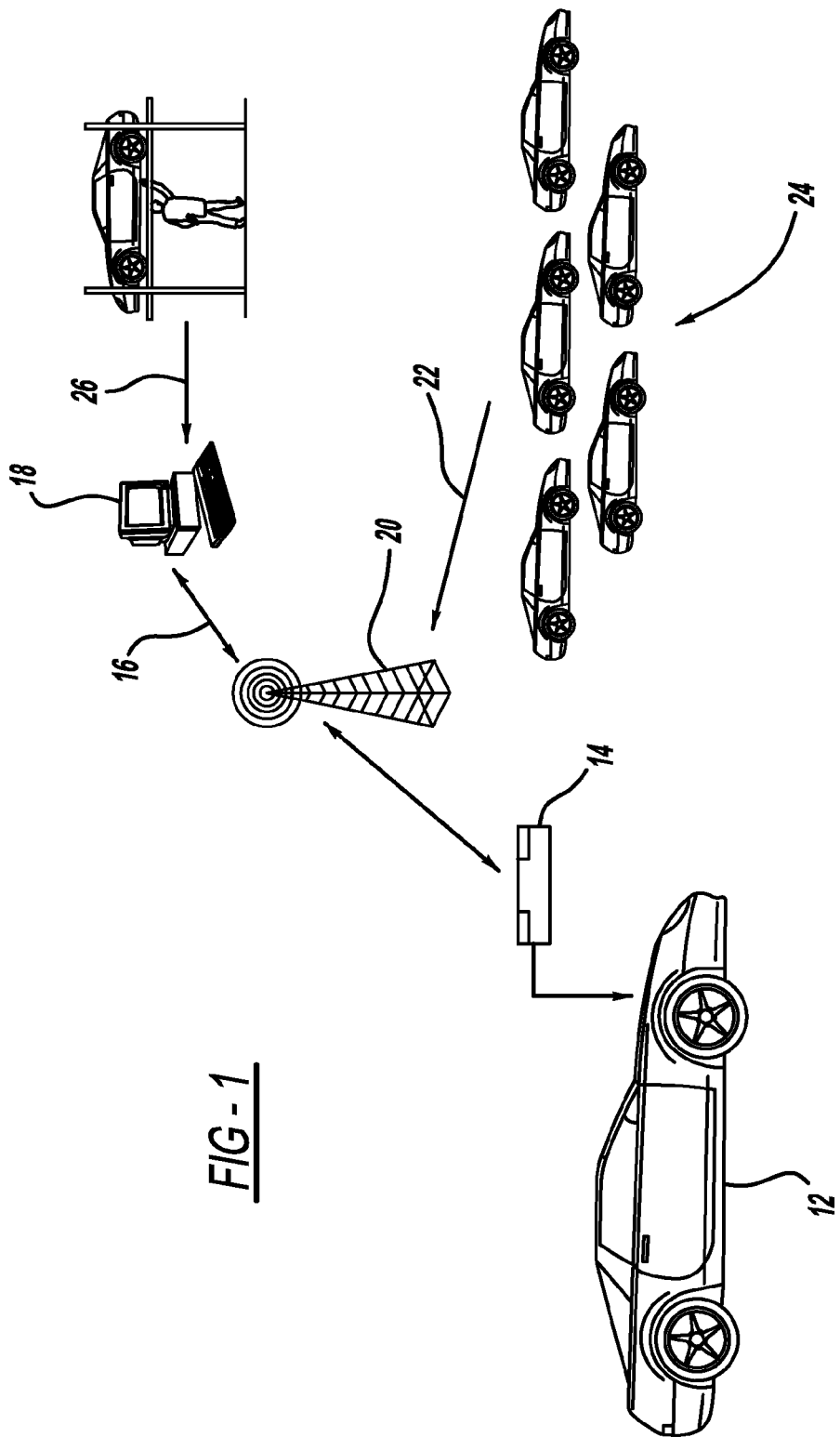
FIG. 1 illustrates an exemplary fault diagnosis and prognosis system, according to one embodiment.

The following discussion of the embodiments of a system and method directed to fault diagnosis and prognosis using temporal data mining of diagnostic trouble codes (DTCs) and selected operating parameters is merely exemplary in nature, and is in no way intended to limit the invention or its applications or uses.

The system and method employ an enhanced vehicle diagnostics framework configured to provide early warning fault prediction for vehicle components. The system includes a multi-tiered framework configured to perform off-board and on-board analysis of both real-time data from a specific vehicle and historical data from a collection of similar vehicles. The off-board analysis includes temporal data mining of time-stamped or sequenced diagnostic trouble codes (DTC) to identify DTC sequences from a large scale population of similar vehicles. In general, DTCs which have become active are the result of software programming configured to look for certain problems in a vehicle and issue flags in the form of diagnostic codes when a specific problem occurs. Thus, it follows that a DTC sequence is a sequence of consecutive flags that occur within a particular time frame. In one embodiment, the DTCs are time-stamped to record the set time or trigger time of the event, however, the method discussed herein may be implemented using DTCs that are merely sequenced.

As set forth above, DTCs are discrete flagged events that are represented by a "0" (i.e., OFF) or a "1" (i.e., ON). In contrast, vehicle operating parameters such as pressure, temperature and voltage, to name a few, are values recorded by a vehicle's on-board system. In an alternative embodiment, the enhanced vehicle diagnostics framework may be implemented using only vehicle parameters, or may be implemented using a combination of vehicle parameters and DTCs. Hereinafter, vehicle parameters and DTCs may be referred to collectively as vehicle data or data sequences.

Off-board analysis also includes using historical data, such as dealership repair data, to draw correlations between the data sequences and subsequent faults. These correlations are used to generate a classifier that is periodically downloaded to the on-board system of all such vehicles. The on-board system is configured to work in connection with the classifier to track real-time data sequences and generate alerts or warnings based on the on-board analysis.

FIG. 1 illustrates an exemplary fault diagnosis and prognosis system 10 having an individual vehicle 12 equipped with an on-board flexible computing platform (FCP) 14, such as Onstar™. A communications link 16 is established between FCP 14 and a server 18 through a cellular tower 20 (an alternative could be via satellite also). A similar communications link 22 is established between server 18 and a population of vehicles 24 through cellular tower 20. In addition, a dealership communications link 26 is provided to establish communication between server 18 and various dealerships 28 throughout the country. Through the dealership communications link 26, server 18 receives repair data for each vehicle that has visited a dealership service department over the life of each vehicle. As discussed in detail below, this historical repair data provides a wealth of information that is used to make connections between the DTC sequences and vehicle faults so as to predict impending component failures. One of ordinary skill in the art understands that communication between server 18, individual vehicle 12 and the population of vehicles 24 through cellular tower 20 is merely exemplary, and that any suitable form of communication may be used, without limitation, which allows information to be transferred between individual vehicle 12, the population of vehicles 24 and server 18.

Server 18 is a computing device configured to receive real-time data from individual vehicles 12 through FCP 14.

Although not specifically shown in FIG. 1, each of the vehicles in the population of vehicles 24 is also equipped with an on-board flexible computing platform (FCP) that is configured to communicate with server 18. Communication links 16, 22 facilitate the periodic upload/download of data and applications 26 between server 18 and vehicles 12, 24. The applications 26 may include, without limitation, advanced diagnostics and early warning prognostics, which include the trained classifiers.

FIG. 2 illustrates an exemplary off-board analysis algorithm 30 for training a classifier to predict component failure. In one embodiment, algorithm 30 is stored on server 18, which extracts DTCs, DTC sequences and vehicle parameters from the population of vehicles 24 at step 32. Note that capturing DTC occurrences and parameters from each vehicle in operation amounts to an extraordinarily large amount of data. Thus, at step 34, algorithm 30 applies a temporal data mining application to filter through the collection of information from the population of vehicles 24 to detect patterns and determine the most frequent sequence occurrences. At step 36, algorithm 30 retrieves the repair data collected by the dealerships from a database (not shown) in server 18. The repair data includes vehicle repair information such as vehicle make and model, date and frequency of repair, triggered DTCs with associated operating parameters, and labor codes (i.e., failure modes) associated with particular DTC patterns.

An association algorithm is applied at step 38 to the collection of data that includes the most frequent DTC and parameter sequence occurrences from the temporal data mining application of step 34 and the repair data collected from the dealerships. The association algorithm compares the sequence occurrences to the repair data and identifies patterns in the collection of data that are causally related to subsequent vehicle failure modes. At step 40, a clustering algorithm is applied to the identified patterns and failure modes and assigns a support and/or confidence measure to each pattern. This is done by clustering the data sequences according to a particular failure mode. The clustering process may include assigning a probability to each sequence and failure mode combination. For example, a sequence consisting of $DTC_1$, $DTC_2$ and $DTC_3$ may be causally related to, and therefore assigned to, Failure Mode (FM) 1. The clustering algorithm may then determine that there is a ninety percent probability that the particular data sequence defined by $DTC_1$, $DTC_2$ and $DTC_3$ is related to FM 1. In one non-limiting example, the clustering algorithm is a distance measure algorithm; however, one of ordinary skill in the art understands that any suitable clustering technique may be employed.

At step 42, a fault prediction classifier is trained to learn the failure modes associated with each cluster. In other words, the classifier is trained to identify the data sequences that lead to particular failure modes (i.e., faults). The classifier may be, for example, a support vector machine (SVM), a decision tree (DT) or a neural network (NN). These classifiers may be used alone or in combination. The above-recited off-board analysis algorithm for training a classifier may be updated periodically post-production to implement new clusters and failure modes that were unforeseeable at the time of manufacture.

FIG. 3 illustrates an exemplary analysis algorithm 50 configured to implement the trained classifier to evolving DTC patterns captured by the on-board FCP 14. Using one approach, algorithm 50 is implemented internal to the vehicle on an on-board flexible computing platform, as set forth in the example below. However, one of ordinary skill in the art understands that algorithm 50 may also be implemented external to the vehicle using an off-board analyzer at a service location or other remote location.

Thus, using an on-board implementation, the trained classifier is downloaded at step 52 from server 18 to a vehicle's on-board FCP 14. These downloads may be upon request or may occur automatically on a recurring basis. In some instances, these downloads may simply be parameter updates to an existing classifier, rather than an entirely new classifier. At step 54 the on-board FCP 14 continually monitors real-time data sequences from the vehicle's control network, which in one non-limiting example is a control area network (CAN) bus. At step 56 the fault classifier is initiated and run on the evolving data sequences to determine if the evolving data sequences are associated with a known fault. In other words, the classifier compares a DTC string to the learned parameters and identifies similar patterns that may lead to a particular fault. At step 58 an early warning alert may be issued to the on-board FCP 14 and ultimately to the vehicle operator if the data string indicates an identified fault in the classifier. In the alternative, the alert may be communicated to a technician or other diagnostic tool.

System 10, including on-board FCP 14 and server 18, may be implemented on one or more suitable computing devices, which generally include software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Such a medium may take many forms, including, but not limited to, non-volatile media, volatile media, and transmission media. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A vehicle fault diagnosis and prognosis system, comprising:
    a computing platform on the vehicle configured to receive a fault classifier from a remote server, the computing platform tangibly embodying computer-executable instructions for:
    evaluating local data sequences received from a vehicle control network; and
    applying the classifier to the local data sequences, wherein the classifier is configured to determine if the local data sequences define a pattern associated with a particular fault where the classifier is trained by comparing data sequences from a first population of vehicles to repair data from a second population of vehicles.

2. The system of claim 1, wherein the local data sequences include one or more the following: sequenced diagnostic trouble codes, time stamped diagnostic trouble codes and vehicle parameters.

3. The system of claim 1, wherein the classifier is trained to associate a plurality of data sequence clusters to a particular failure mode.

4. The system of claim 1, wherein the data sequences in the classifier are derived from the first population of vehicles using temporal data mining.

5. A method for fault diagnosis and prognosis, comprising:
    extracting data sequences from a first population of vehicles;
    applying a temporal data mining application to the data sequences extracted from the first population of vehicles to detect patterns in the data sequences;
    retrieving repair data related to a second population of vehicles;
    comparing the data sequences to the repair data to identify data sequences that are related to a particular failure mode;
    applying a clustering algorithm to create clusters of data sequences related to the particular failure mode using the identified data sequences that are related to the particular failure mode;
    training a fault prediction classifier to learn the particular failure modes associated with each cluster so the fault prediction classifier can identify the data sequences that lead to particular failure modes, said fault prediction classifier using a neural network, a support vector machine and a decision tree;
    sending the fault classifier to a computing platform on a vehicle; and
    receiving the fault classifier in the computing platform and the computing platform executing instructions for:
        evaluating data sequences received from a vehicle control network; and
        applying the classifier to the data sequences, wherein the classifier is configured to determine if the data sequences define a pattern associated with a particular fault.

6. The method of claim 5, wherein applying the clustering algorithm includes assigning a probability to each data sequence and particular failure mode combination.

7. The method of claim 5, wherein applying the clustering algorithm includes clustering the data sequences according to a particular failure mode.

8. The method of claim 5, wherein applying the temporal data mining application includes identifying frequent data sequences.

9. The method of claim 5, wherein the first population of vehicles is similar to the second population of vehicles.

10. The method of claim 5, wherein applying the clustering algorithm to create clusters includes assigning a confidence measure to each of the identified data sequences related to a particular failure mode.

11. A computer-readable medium tangibly embodying computer-executable instructions for:
    extracting data sequences from a first population of vehicles;
    applying a temporal data mining application to the data sequences extracted from the first population of vehicles to detect patterns in the data sequences;
    retrieving repair data related to a second population of vehicles;
    comparing the data sequences to the repair data to identify data sequences that are related to a failure mode;
    applying a clustering algorithm to create clusters of data sequences related to the failure mode using the identified data sequences that are related to the failure mode; and
    training a fault prediction classifier to learn the failure modes associated with each cluster so the fault prediction classifier can identify the data sequences that lead to failure modes, said fault prediction classifier using a neural network.

12. The computer-readable medium of claim 11, wherein the fault prediction classifier uses a support vector machine and a decision tree.

13. The computer-readable medium of claim 11, wherein the fault prediction classifier uses a decision tree.

14. The computer-readable medium of claim 11, wherein the fault prediction classifier uses a support vector machine.

15. The computer-readable medium of claim 11, wherein applying the temporal data mining application includes identifying frequent data sequences.

16. The computer-readable medium of claim 11, wherein applying the clustering algorithm to create clusters includes assigning a confidence measure to each of the identified data sequences related to a failure mode.

17. The computer-readable medium of claim 11, wherein applying the clustering algorithm includes clustering the data sequences according to a failure mode.

18. The computer-readable medium of claim 11, wherein applying the clustering algorithm includes assigning a probability to each data sequences and failure mode combination.

19. The computer-readable medium of claim 18, further including downloading the classifier to an off-board computing platform.

20. The computer-readable medium of claim 18, further including downloading the classifier to an on-board flexible computing platform.

21. The computer-readable medium of claim 11, wherein the clustering algorithm is a distance measuring algorithm.

* * * * *